Patented Nov. 4, 1952

2,616,891

UNITED STATES PATENT OFFICE 2,616,891

ANTHRAQUINONE-ACRIDONE DERIVATIVES OF -1,3,4-OXDIAZOLES

Heinz W. Schwechten, Leverkusen-Bayerwerk, and Josef Singer, Leverkusen-Wiesdorf, Germany, assignors to Farbenfabriken Bayer, Leverkusen, Germany, a manufacturing and trading organization of Germany No Drawing. Application October 17, 1950, Serial No. 190,643. In Germany October 20, 1949

1 Claim. (Cl. 260—276)

This invention relates to new compounds of the oxdiazole series and more particularly to new vat dyestuffs and the intermediates therefor and to processes for the production of said oxdiazole compounds.

Vat dyestuffs of the oxdiazole series have been disclosed in U. S. Patent No. 2,464,831. These vat dyestuffs comprise 2,5 - di(2' - anthraquinonyl) - 1,3,4-oxdiazoles which carry in at least one of the anthraquinone radicals, in the 1-position, a radical of the group consisting of $NO_2$ and $NH_2$. This group of new vat dyestuffs dyes textiles in red shades only.

It is an object of the present invention to produce new and valuable vat dyestuffs of the oxdiazole series dyeing textiles in various shades. A further object of the present invention is to provide new intermediates for the production of these new vat dyestuffs. It is a still further object of the present invention to provide a new process for the production of the new dyestuffs and intermediates.

We have found that new and valuable compounds of the 1,3,4-oxdiazole series and new and valuable vat dyestuffs of the 1,3,4-oxdiazole series which dye textile fibres in various shades and which have good fastness properties may be produced by treating with dehydrating agents N,N'-diacylhydrazides containing the diacylhydrazide grouping at least once, one acyl being the radical of an anthraquinone carboxylic acid, the second acyl of each hydrazide grouping being the radical of an acid selected from the group consisting of aliphatic carboxylic acids, aromatic carboxylic acids, chloro substituted aromatic carboxylic acids, amino substituted aromatic carboxylic acids, thiazolanthrone carboxylic acid, pyrazolanthrone carboxylic acid, phthaloylcarbazole carboxylic acid, and phthaloylacridone carboxylic acid.

A modification of the process comprises treating a mixture of a mono acylhydrazide and a carboxylic acid or a functional derivative thereof with a fuming sulfuric acid or chlorosulfonic acid, whereby one of the employed carboxylic acids is an anthraquinone carboxylic acid and the other is an acid selected from the group consisting of aromatic carboxylic acids, chloro substituted aromatic carboxylic acids, nitro substituted aromatic carboxylic acids, thiazolanthrone carboxylic acid, pyrazolanthrone carboxylic acid, phthaloylcarbazole carboxylic acid, and phthalylacridone carboxylic acid.

The new group of 1,3,4-oxdiazole compounds comprises a great number of individuals which may vary in the number of the oxdiazole nuclei as well as in the substituents being linked to the 1,3,4-oxdiazole nuclei in 2- or 5-position. These compounds may contain the 1,3,4-oxdiazole nucleus once or twice. However, compounds may also be prepared which contain more than two 1,3,4-oxdiazole nuclei. These compounds are believed to be of no great technical importance since their production on a technical scale and their utilization involves at present some difficulties.

If only one 1,3,4-oxdiazole nucleus is present in the new oxdiazole compound, one substituent in position 2 or 5 is a β-anthraquinonyl or substituted β-anthraquinonyl and the other substituent may be the radical of an aliphatic hydrocarbon containing 1 to 10 or more C-atoms. The second substituent may also be the radical of an aromatic hydrocarbon e. g. benzene, naphthalene, which may carry further substituents, such as amino groups, nitro groups, acylamino groups, and chlorine or also the radical of a vattable cyclic system, for instance thiazolanthrone, pyrazolanthrone, phthaloyl carbazole, phthaloyl thioxanthrone, and phthaloylacridone.

If two 1,3,4-oxdiazole nuclei are present, the nuclei may either be linked by an anthraquinone radical or one or both nuclei may contain a β-anthraquinonyl. The 2- and 5-positions non-substituted by anthraquinone radicals may be substituted by aliphatic or aromatic radicals as described above, whereby, in case aliphatic radicals are present, those containing 2 to 6 C-atoms are preferred.

As starting materials for the production of the new vattable 1,3,4-oxdiazole compounds the unsymmetrically substituted N,N'-diacylhydrazides containing at least one vattable cyclic acyl may be used. If the latter is not derived from 2-anthraquinone carboxylic acid, the hydrazides may be symmetrical. If the N,N'-diacylhydrazides contain the diacylhydrazide grouping twice or several times, the hydrazide groups are combined by polybasic vattable or non-vattable carboxylic radicals.

Suitable vattable cyclic mono- or polycarboxylic acids are, for instance, those of anthraquinone, thiazolanthrone, phthaloylacridone, pyrazolanthrone, phthaloylcarbazole, phthaloyl thioxanthrone; as non-vattable carboxylic acids may be used, for instance, acetic acid, benzoic acid, naphthalene carboxylic acid, succinic acid, glutaric acid, pimelic acids, isophthalic acid, terephthalic acid, azobenzoic acid. Said carboxylic acids may be substituted, for instance, by nitro or amino groups or by halogens, such as chlorine.

The N,N'-diacylhydrazides are obtained, for instance, by reacting in known manner the chloride of a vattable cyclic carboxylic acid with the monoacylhydrazide of a non-vattable carboxylic acid or, inversely, the chloride of a non-vattable carboxylic acid with the monoacylhydrazide of a vattable cyclic carboxylic acid. Diacylhydrazides containing two hydrazide groupings may be prepared in known manner, for instance, from the dichloride of a non-vattable dicarboxylic acid and the monoacylhydrazide of a vattable cyclic carboxylic acid or also in the reverse order.

As dehydrating agents may be used fuming sulfuric acid, chlorosulfonic acid, thionylchloride, toluene sulfochloride, toluene sulfonic acid, etc.

If the ring-closure is effected with fuming sulfuric acid or chlorosulfonic acid, mostly no preformed diacylhydrazides are required for the reaction. In some cases, for instance, a monoacylhydrazide together with the corresponding carboxylic acid or polycarboxylic acid or the functional derivatives thereof, such as esters or halides, may be introduced into the chlorosulfonic acid or the fuming sulfuric acid respectively. The intermediarily formed hydrazides are converted into the oxdiazole compounds. Formation of the oxdiazole compounds is promoted by slightly heating.

The new oxdiazole compounds obtained according to the present invention represent vat dyestuffs dyeing the fibre in the most various shades, for instance, yellow, red, or blue, the shade depending on the carboxylic acids used and depending on the kind, number and position of the substituents, or intermediates which may be easily converted into such dyestuffs.

Especially valuable compounds according to the present invention are for instance those obtained in the following examples which illustrate the invention without restricting it thereto, the parts being by weight:

*Example 1*

27 parts of anthraquinone-2-carboxylic acid chloride in 250 parts of chlorobenzene are mixed with stirring at 30° C. with a suspension of 18.1 parts of p-nitrobenzoyl hydrazide in 200 parts of n/2 caustic soda solution until the reaction has become neutral.

The chlorobenzene is subsequently distilled off with steam and the hydrazide thus obtained is sucked off, washed with water and dried.

The hydrazide is heated to 50° C. for about 20 minutes in the five-fold amount of fuming sulfuric acid containing about 10% of $SO_3$. The mixture is then poured onto ice, the precipitated oxdiazole is squeezed off, washed neutral and reduced by vatting with sodium hydrosulfite. 2 - (p-amino-phenyl) - 5 - (2'- anthraquinonyl) - oxdiazole isolated as usual crystallizes from nitrobenzene in small leaves having the colour of 2-amino-anthraquinone. The reaction product can be used in the most various manner, similar to the known 2-(p-amino-phenyl)-anthraquinone for the synthesis of vat dyestuffs. For instance, by acylation with thiazolanthrone-carboxylic acid chloride a full, greenish-yellow dyestuff with very good properties is obtained.

The ring-closure of the hydrazide to the oxdiazole can also be effected in nitrobenzene with thionylchloride. Oxdiazole may also directly be obtained by reacting anthraquinone-2-carboxylic acid with p-nitrobenzoyl hydrazide in fuming sulfuric acid or chlorosulfonic acid according to the following procedure: 13 parts of anthraquinone-2-carboxylic acid are heated to 90° C. for 10 minutes with 9 parts of p-nitrobenzoyl hydrazide in 100 parts of fuming sulfuric acid containing about 10% of $SO_3$. The mixture is then poured onto ice, the precipitated oxdiazole is squeezed off, washed neutral and reduced by vatting. The reaction product may be purified by recrystallizing from nitrobenzene. The product is identical with the above-said p-aminophenyl-anthraquinonyl-oxdiazole.

The dyestuff may also be obtained by heating 13 parts of anthraquinone-2-carboxylic acid and 9 parts of p-nitrobenzene hydrazide in 100 parts of fuming sulfuric acid containing about 10% of anhydride for 10 minutes at 90° C. After cooling the melt is poured onto ice and isolation of the intermediate is accomplished as described above. The 2-($\beta$-anthraquinonyl) - 5 - (p-nitrophenyl) - oxdiazole is then reduced to the amino compound which may be purified by recrystallization from nitrobenzene or quinoline.

*Example 2*

A boiling solution consisting of 9 parts of p-nitro-benzoyl hydrazide in 400 parts of nitrobenzene is reacted with a suspension of 15 parts of 1-amino-anthraquinone-2-carboxylic-acid chloride in 120 parts of nitrobenzene. The diacylhydrazide thus formed crystallizes immediately in scarlet-coloured needles which are separated, dissolved in 100 parts of chlorosulfonic acid and converted by shortly heating to 50° C. into the corresponding oxdiazole which is precipitated by pouring onto ice. The oxdiazole is thereafter filtered off, washed and dried.

By reducing the nitro group an intermediate product is obtained therefrom which similar to the amino compound referred to in Example 1 may be used for the synthesis of valuable vat dyestuffs. For instance, by acylating with benzoyl chloride a dyestuff is obtained which dyes cotton scarlet shades and exhibits the following constitution:

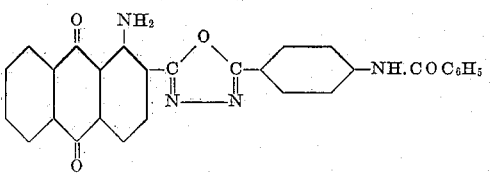

By acylating with thiazolanthrone-carboxylic chloride a scarlet dyestuff is obtained which dyes cotton yellowish shades. With 1-amino-anthraquinone-2-carboxylic chloride a full red dyestuff is obtained.

The intermediate product may also be converted in the usual manner into the corresponding urea derivative or may be reacted with cyanuric chloride. Dyestuffs are obtained thereby which dye cotton in yellowish-scarlet shades.

*Example 3*

A suspension of 30.5 parts of 1-chloroanthraquinone-2-carboxylic chloride in 300 parts of chlorobenzene is mixed with stirring at room temperature with a solution of 5.3 parts of soda and 8.7 parts of adipic acid dihydrazide in 300 parts of water. After completion of the reaction the chlorobenzene is removed by steam distillation. The reaction product is sucked off, washed with water and dried.

For conversion into the corresponding oxdiazole the hydrazide thus obtained is dissolved in the ten-fold amount of fuming sulfuric acid containing about 10% of SO₃ and heated to 50° C. for about 10 minutes. The melt is then poured onto ice. The precipitate is filtered off, washed with water and dried. By subjecting the oxdiazole thus obtained to the known toluene sulfonamide melt and by subsequently saponifying the bis-p-toluene sulfonamide compound formed the oxdiazole of the formula:

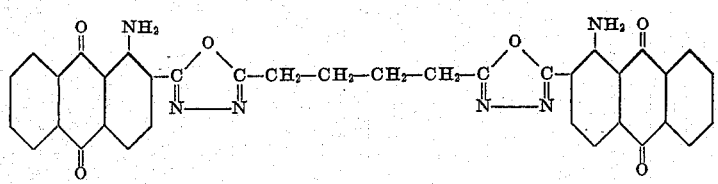

is obtained. This dyestuff dissolves in sulfuric acid with yellow coloration and dyes from claret-coloured vat full and clear scarlet shades.

*Example 4*

A solution of 11.5 parts of 1-amino-anthraquinone-2-carboxylic chloride in 200 parts of nitrobenzene is mixed with stirring at room temperature with 3.9 parts of terephthalic acid dihydrazide in 200 parts of n/5-caustic soda solution.

When the reaction is complete the bis-(1-amino-anthraquinone-2-carboxylic acid - hydrazide) of the terephthalic acid is isolated and converted as described in Example 3 into the oxdiazole of the formula

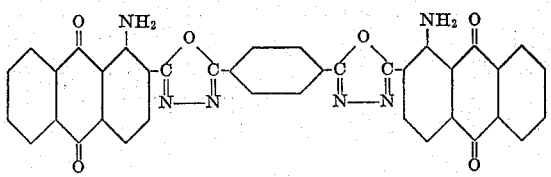

The dyestuff is obtained in pure crystalline form as sulfate by dissolving in sulfuric acid and carefully precipitating with water. The sulfuric acid solution shows a yellow coloration.

The dyestuff dyes cotton from claret coloured vat yellowish red shades. In similar manner oxalic acid dihydrazide and 1-amino-anthraquinone-2-carboxylic chloride yield a dyestuff dissolving in sulfuric acid with yellow coloration and dyeing cotton yellowish red shades from claret coloured vat.

*Example 5*

20 parts of 1,5-dichloro-anthraquinone-2,6-dicarboxylic chloride are dissolved in 200 parts of chloro-toluene and added with stirring to a suspension of 17 parts of p-chlorobenzoyl hydrazide in 200 parts of n/2-caustic soda solution at 30° C. The hydrazide thus obtained is isolated as described in Example 3 and converted into the corresponding oxdiazole by heating to 50° C. for some hours in the ten-fold quantity of fuming sulfuric acid containing 10% of SO₃. By applying the toluene sulfamide melt as described in Example 3 the dyestuff of the following formula is obtained:

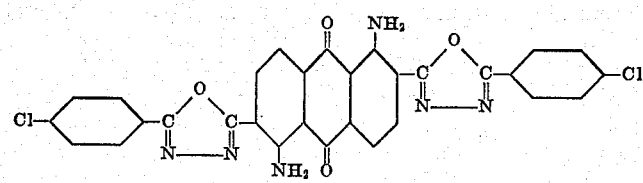

The dyestuff dissolves in sulfuric acid with brownish-yellow coloration and dyes cotton bluish-violet shades.

*Example 6*

11 parts of 1-amino-anthraquinone-2-carboxylic acid hydrazide, 300 parts of o-dichlorobenzene and 15 parts of anthraquinone-benzacridone-carboxylic chloride of the formula

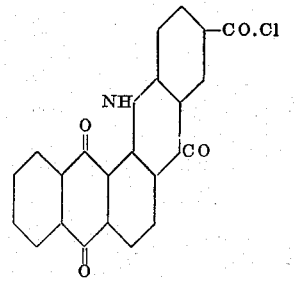

are heated to the boil until the evolution of HCl has finished. The diacylhydrazide thus obtained is sucked off at 90° C., washed with o-dichlorobenzene and dried.

23 parts of diacylhydrazide are introduced with ice-cooling into 200 parts of fuming sulfuric acid containing 10% of SO₃ and stirred at room temperature until a test sample does no longer show a change in colour when adding alkali. The melt is then poured onto ice, the precipitated oxdiazole is sucked off, washed neutral and dried. The dyestuff is purified by cautiously adding water to its orange-coloured solution in concentrated sulfuric acid. The dyestuff precipitates thereby in orange-coloured crystals as sulfate. Cotton is dyed from blue-coloured vat red shades of excellent fastness to light.

*Example 7*

A solution of 28 parts of 1-amino-anthroquinone-2-carboxylic acid hydrazide in 1100 parts of o-dichlorobenzene heated nearly to the boil is mixed with stirring with a solution of 15.4 parts of p-azobenzoic chloride in 200 parts of o-dichlorobenzene. The hydrazide thus obtained immediately begins to precipitate in fine scarlet needles. After solidifying the reaction product is sucked off, washed with chlorobenzene and dried.

For converting into the corresponding oxdiazole dyestuff the hydrazide is dissolved in the ten-fold amount of fuming sulfuric acid containing about 10% of $SO_3$. After about one hour standing at 30° C. the solution is diluted by cautiously adding water whereby the oxdiazole of the furmula crystalizes as surfate.

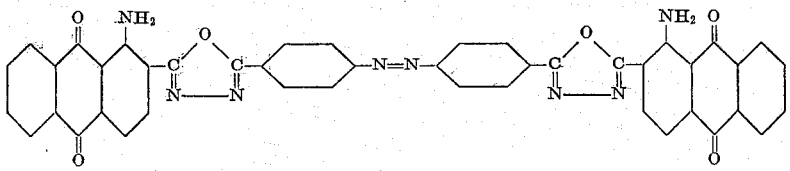

The dyestuff dissolves in sulfuric acid with yellow coloration and dyes cotton scarlet shades from claret-coloured vat.

Red vat dyestuffs of the oxdiazole series are described in U. S. Patent 2,464,831. They consist of oxdiazoles wherein two anthraquinonyl residues are linked to one oxdiazole grouping.

*Example 8*

On following the procedure of the foregoing example, however, replacing 15.4 parts of p-azobenzoic acid chloride by the equivalent amount of 2,6-naphthalene dicarboxylic acid chloride the dyestuff of the following constitution is obtained.

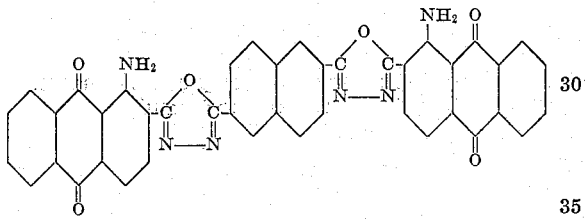

The dyestuff dissolves in sulfuric acid with yellow coloration and dyes cotton scarlet red shades from claret-coloured vat.

*Example 9*

10 parts of 1-aminoanthraquinone-2-carboxylic acid hydrazide in 250 parts of slightly boiling o-dichlorobenzene are reacted with 11.5 parts of thiazolanthrone-2-carboxylic acid chloride. The mixture is kept at the boil until the formation of hydrochloric acid is complete.

After cooling the hydrazide of the fomula

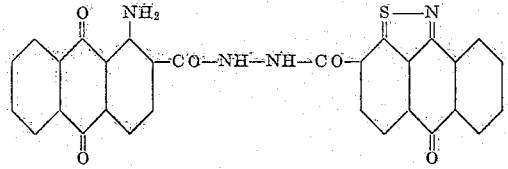

is sucked off, washed with methanol and dried.

For converting into the corresponding oxdiazole the dihydrazide obtained is treated with about 10 parts of fuming sulfuric acid (20% of $SO_3$) or chlorosulfonic acid at temperatures below 100° C. and isolated as indicated in Example 6.

A dyestuff dyeing cotton scarlet shades from red brown vat is obtained.

We claim:

The new compound of the oxdiazole series having the formula

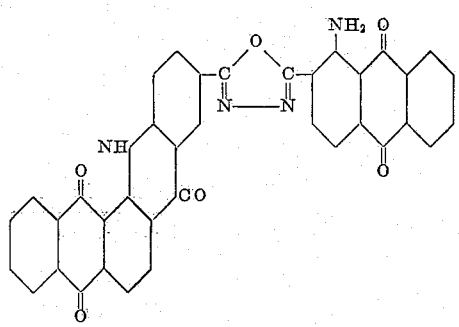

HEINZ W. SCHWECHTEN.
JOSEF SINGER.

REFERENCES CITED

The following references are of record in the file of this patent:

UNITED STATES PATENTS

| Number | Name | Date |
|---|---|---|
| 2,464,831 | Stilmar | Mar. 22, 1949 |
| 2,511,018 | Stilmar | June 13, 1950 |